United States Patent [19]

Haddix

[11] Patent Number: 5,603,164
[45] Date of Patent: Feb. 18, 1997

[54] ADJUSTABLE ANGLE GUIDE AND ANGLE FINDER

[76] Inventor: Paul A. Haddix, 107 Vine St., Cynthiana, Ky. 41031

[21] Appl. No.: 376,804

[22] Filed: Feb. 27, 1995

[51] Int. Cl.⁶ ........................................... B43L 7/10
[52] U.S. Cl. .................... 33/456; 33/464; 83/421; 83/522.18; 83/522.25; 269/236; 269/249
[58] Field of Search ............................. 33/456, 452, 455, 33/459, 460, 463, 464, 495, 500; 83/375, 421, 522.15, 522.16, 522.17, 522.18, 522.25; 269/41, 249, 236

[56] References Cited

U.S. PATENT DOCUMENTS

| | | | |
|---|---|---|---|
| 830,322 | 9/1906 | Hodge | 33/456 |
| 1,640,604 | 8/1927 | Hauber | 33/463 |
| 1,906,988 | 5/1933 | McFarland | 33/456 |
| 2,642,905 | 6/1953 | Hewat | 269/249 |
| 2,724,184 | 11/1955 | Spear, Jr. | 33/459 |
| 4,706,963 | 11/1987 | Geuss | 269/236 |
| 5,414,938 | 5/1995 | Meek | 33/456 |

FOREIGN PATENT DOCUMENTS

| 32898 | 12/1964 | Germany | 33/456 |
|---|---|---|---|

*Primary Examiner*—Christopher W. Fulton
*Attorney, Agent, or Firm*—John R. Benefiel

[57] ABSTRACT

An angle guide device is disclosed which includes a slotted base member pivoted at one end to one end of an angle guide member, an adjustment member pivoted at one end to the angle guide and carrying a slider element at the other end. The slider element is slidable in the slot but may be locked in any adjusted position. Numeric indicia indicate the angle between the base member and angle guide members in each position of the slides along the track. The base member is clamped to a workpiece by dual action clamps separately clamping to the workpiece and to the base member. Extension pieces may be attached to increase the length of the guide member.

8 Claims, 4 Drawing Sheets

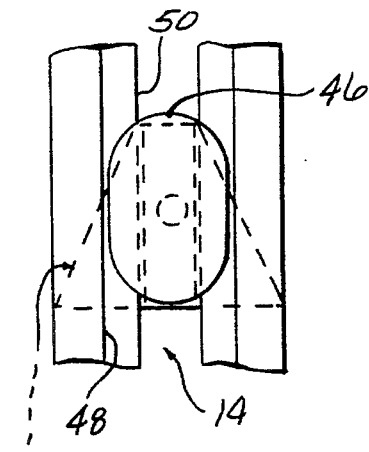
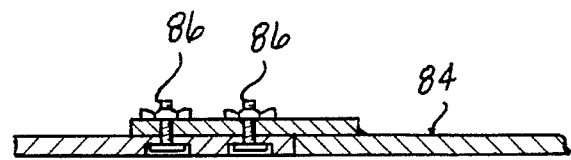
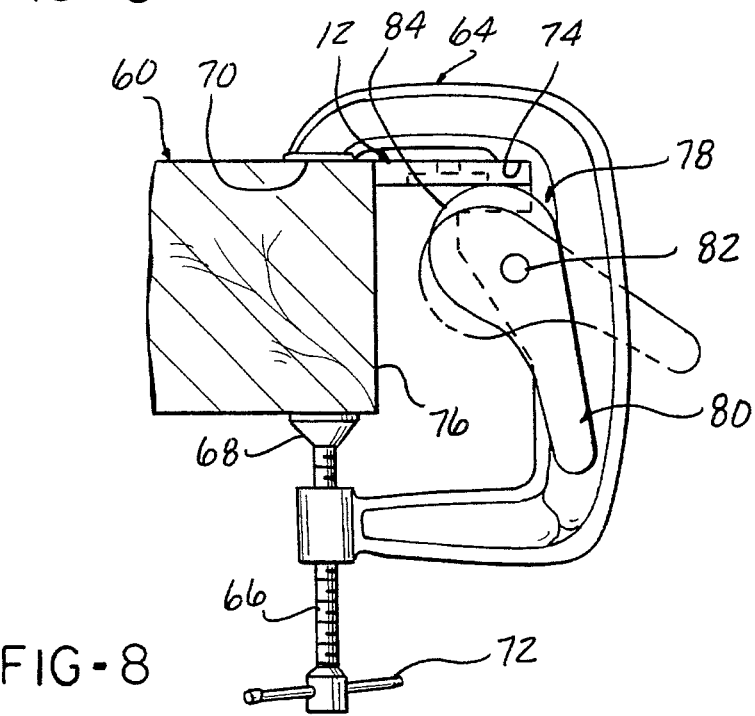
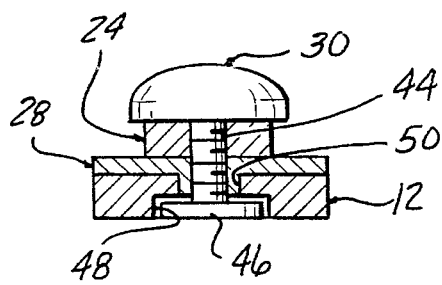
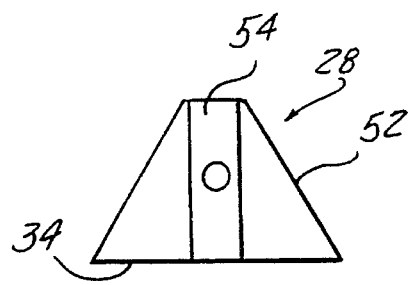

1

ADJUSTABLE ANGLE GUIDE AND ANGLE FINDER

FIELD OF THE INVENTION

This invention concerns adjustable angle guides such as are used for guiding a circular saw when making angled cuts on lumber pieces or scribing lines on sheets of material, or, for determining an angle between two members.

BACKGROUND OF THE INVENTION

There is often a need to scribe lines from the edge of a piece of lumber or sheet material at a predetermined angle. For example, in framing a roof, the roof rafters must have their ends trimmed so as to establish the pitch angle of the roof to be constructed.

U.S. Pat. No. 4,138,914 issued on Feb. 13, 1979 for a "Saw Guide Apparatus" shows an adjustable saw guide useful for such purpose.

It is sometimes necessary to match an angle existing between two members in order to scribe the same angle on a workpiece. In such cases, any device used for this purpose must be able to be insertable between the members to be adjusted in conformity with the angle existing between these members.

Such guides and adjustable angles are often used for scribing lines on sheet material such as plywood, glass, drywall, etc. preparatory to cutting the same at a predetermined angle between the side edge of the sheet material.

U.S. Pat. No. 4,955,141 issued on Sep. 11, 1990 for "An Adjustable Pivot Angle Square Invention" describes such a general purpose adjustable angle device in which two elongated members are pivotally mounted to each other at one end and with a connecting member pivotally connected at one end to one of the members and sliding within an elongated slot formed in the other member. As the connecting member moves along the slot, varying adjustable angles are formed between the first two pivotally connected members.

See also U.S. Pat. No. 1,906,988 issued on May 2, 1933 for a "Measuring Apparatus" similarly showing a slotted member pinned at one end to a second elongated member with a connecting member pinned to the second member, and having one end attached to a slider moving through the slot. This enables a setting of an angle between the first and second mentioned members.

In each case, the devices are not readily adjustable through a full 360° rotation. In the case of U.S. Pat. No. 1,906,988, an interference is created between the second and third members, while in U.S. Pat. No. 4,955,141, an interference similarly is encountered necessitating a reversal of the adjustment rotation and a reorientation of the device in order to carry out a 180° adjustment capability. The device shown in U.S. Pat. No. 4,955,141 is not practically useable as an angle measuring apparatus since a projecting corner is created at each apex of the pivotally joined members preventing a flush interfitting within angled members to be measured, and also creating saw guide interference at the end of the guide.

It is sometimes necessary to provide a guide which extends for considerable distances as in the case of using the device to scribe or cut across large pieces of sheet material. In such instances, neither of these prior art devices described above are able to be effectively used for spanning such larger distances, necessitating an approximation of a scribe line or clamping of a secondary guide member to the piece to be cut or scribed.

When such devices are used as a saw guide, a base member must be held against the lumber piece or other material being cut as the saw is advanced across the angled member with the base member being held in an accurately determined positioned as the sawing operation is continued. Oftentimes there is some slight shifting movement resulting from the urging of the saw edge against the member used as the guide, with a resultant loss of accuracy in the cut.

Accordingly, it is an object of the present invention to provide an adjustable guide and angle finder device which is capable of adjustment through a full 180° or even 360° rotation in a single direction of adjustment without requiring reorienting the device to achieve an angle adjustment through the complete 360° range.

It is a further object of the present invention to provide such a device in which an uninterrupted contour is maintained at the apex of the angled members to allow use of the device as an angle finder by being interfit flush against the angled members, and to preclude any interference with a saw being moved anywhere along the angled member edge.

It is still another object of the present invention to provide such an adjustable angle device in which the device is able to be secured to the member on which an angle is being cut or scribed such as to eliminate the need for manually holding the angle against the member during scribing, saw cutting, etc.

It is yet another object of the present invention to provide such a device which is adaptable for use across relatively large distances.

SUMMARY OF THE INVENTION

These and other objects of the present invention, which will become apparent upon a reading of the following specification and claims, are achieved by a slotted main or base member pivotally mounted at one end to one end of an angle guide member. The ends of the base member and angle guide member are radiused such as to provide an uninterrupted guide edge throughout the range of pivotal movement between the base member and angle guide member.

An adjustment member is pinned to the angle guide member at one end and has an angle marker slider element pivotally mounted to the other end, the angle slider element travelling within the slot on the base member. The base member is provided with a series of angle numeric indicia corresponding to the angle between the base member and the angle guide member in each adjusted position.

A friction lock knob secures the slider element in any adjusted position.

The slot is of sufficient length so as to allow rotation of the angle guide member to be aligned with the base member, with the pivotal connection preferably being of a flush design such as to not create an interference as the angle guide member is rotated through the entire 360° range.

The base member is adapted to be selectively clamped to a workpiece on which the angle is to be cut or scribed by two or more special clamps having dual sets of clamping jaws. A first set of clamping jaws are located beyond the base member and engage the workpiece against which the base member is to be held.

A second set of clamping jaws allows clamping of the base member to the clamp frame at any selected position, thus allowing the base member to be slid alongside the piece to which the clamps have been previously secured and locked thereto in any adjusted position.

An extension for the angle member is attached at the outboard end thereof with a secondary adjustment member pivotally attached to the extension member and also provided with a slider for movement within the base member slot. This thus allows the use of the angled guide with large dimensioned workpieces.

DESCRIPTION OF THE DRAWINGS

FIG. 3 is a reverse view of the angle marker slide incorporated in the device shown in FIG. 1 with a fragmentary portion of the base member on which the slide is installed.

FIG. 4 is a view of a section through the slider base member and friction lock knob incorporated in the device shown in FIG. 1.

FIG. 5 is a top plan view of the angle marker slider element shown in FIG. 3.

FIG. 8 is a side elevational view of the clamp shown in FIG. 7, with a fragmentary sectional view of the workpiece, the operation of the secondary clamp being shown in phantom lines.

FIG. 12 is a fragmentary sectional view of a portion of the attached extension shown in FIG. 11.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
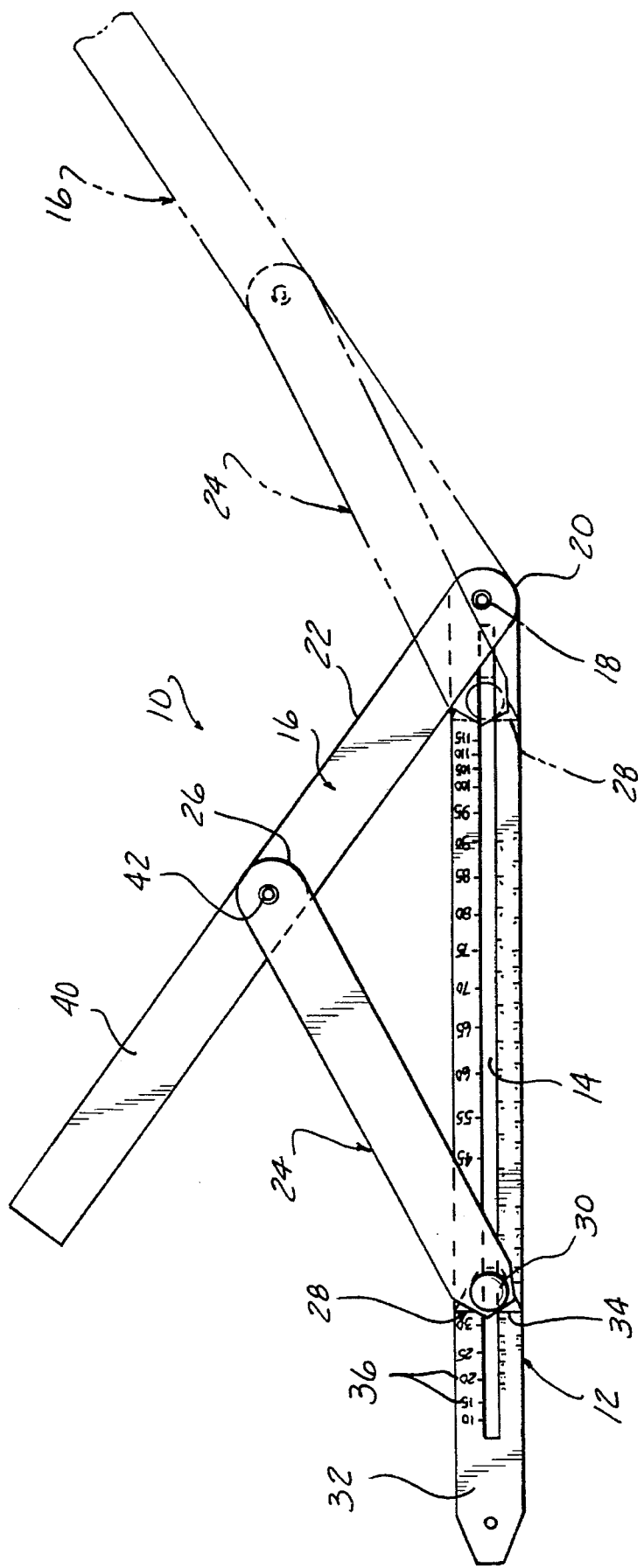
FIG. 1 is a plan view of the adjustable angle guide and angle finder according to the present invention, with a phantom line depiction of the angled guide and adjustment member shifted to an adjusted position in access of 115°.

Referring to the drawings and particularly FIG. 1, the adjustable angle guide device 10 according to the present invention includes an elongated blade-shaped base member 12 which may be constructed of metal or plastic and is formed with an elongated slot 14 extending lengthwise for a major portion of the length of the base member 12. An elongated blade-shaped angle guide member 16 is pivotally mounted at one end to one end of the base member 12, a suitable pivot connection 18 provided for this purpose.

The pivotally mounted ends of the base member 12 and the angle guide member 16 each have completely radiused end surfaces 20 so that as the angle guide member 16 pivots about the connection 18, no feature projects beyond the guide edge 22.

An elongated blade-shaped adjustment member 24 is pivotally mounted at one end to the angle guide member 16 at a point intermediate the length thereof. The outer surface 26 of the adjustment member 24 is similarly radiused such as to not allow any projecting feature to project through the plane of the guide edge 22.

The opposite end of the adjustment member 24 is attached to a slider element 28 which is pivotally mounted to the opposite end of the adjustment member 24 and which is slidably interfit into the slot 14 of the base member 12. A friction lock means is provided including a rotatable knob 30 which when tightened by turning will secure the slider element 28 in any position along the slot 14 to thereby maintain any adjusted angular relationship between the base member 12 and the angle guide member 16.

The slider element 28 has a portion resting above the upper face 32 of the base member 12 which defines a transverse indicator edge 34 which is slid along a sequence of numeric indicia 36 and line markings distributed along the length of the base member 12 adjacent one side of the slot 14. The numeric indicia correspond to the angle in degrees which exist between the base member 12 and the angle guide member 16 in each position of the adjustment member 24.

Figure 2:
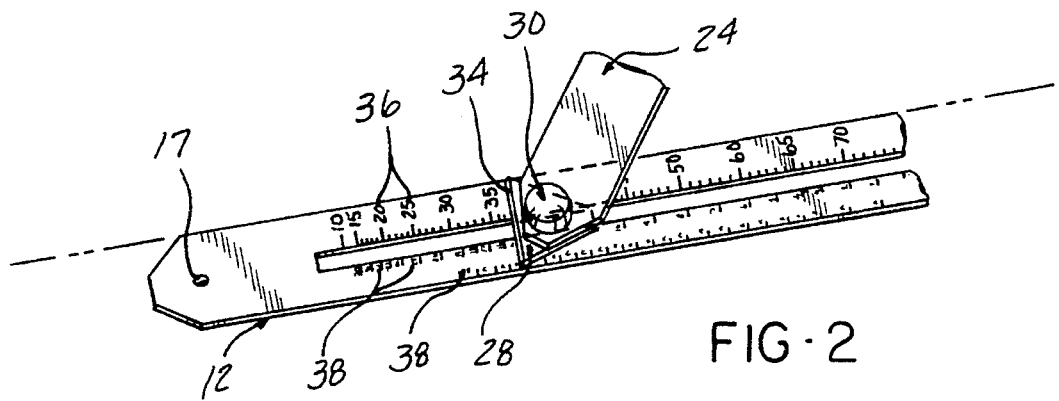
FIG. 2 is an enlarged fragmentary view of a portion of the base member and adjustment members included in the device shown in FIG. 1.

This is best seen in FIG. 2 where certain auxiliary scales related to carpentry needs may also be provided, such as various roof cut angle indicia 38.

The angle guide member 16 is positioned atop the upper face 32 of the base member 12. The adjustment member 24 in turn is mounted atop the face 40 of the angle guide member 16 which is opposite the face positioned against the upper face 32 of the base member 12. The other end of the adjustment member 24 is positioned atop the face 32 of the base member 12.

Thus, the angle guide member 16 can swing freely without interference about the pivotal connection 18 through a range of motion over 90° and at least 180°. The pivotal connection 18 is preferably of a flush design such as to allow sweeping of the adjustment member 24 further from the obtuse angle as shown in FIG. 1.

Figure 10:
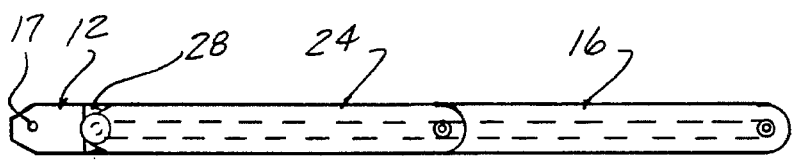
FIG. 10 is a plan view of the angle guide device in a fold-up condition.

In the opposite direction of rotation, the slider element 28 is extended to the full extent of the slot 14 and the length of the angle guide 16 is such as to allow the angle guide member to pass behind the slider and thus allow a completely collapsed folding thereof as shown in FIG. 10. In this embodiment, the indicia 38 are completely covered and protected. A hole 17 in one end of the base member allows convenient hanging of the device for storage.

FIGS. 3, 4, and 5 show details of the elements described above. The friction locking knob 30 receives a threaded stem 44 integral with a T-head 46 which is interfit into a widened portion 48 of the slot 14 through the base member 12. The threaded stem passes upwardly through a narrower section 50 through the other end of the adjustment member 24.

The slider element 28 is interposed therebetween including a truncated triangular top portion 52 and a rail section 54 which are fit into the narrower slot portion 50. The front edge of the truncated triangular section 52 defines the front edge 34 which aligns with numeric indicia 36 on the upper face of the guide member.

Accordingly, when the knob 30 is turned to tighten, the adjustment member 24, the slider element 28, and the base member 12 are squeezed together to establish a frictional lock in any adjusted position.

The T-portion 46 is recessed within the enlarged slot 48 such that the bottom of the base member 12 is free from any projecting feature on its undersurface.

Figure 6:
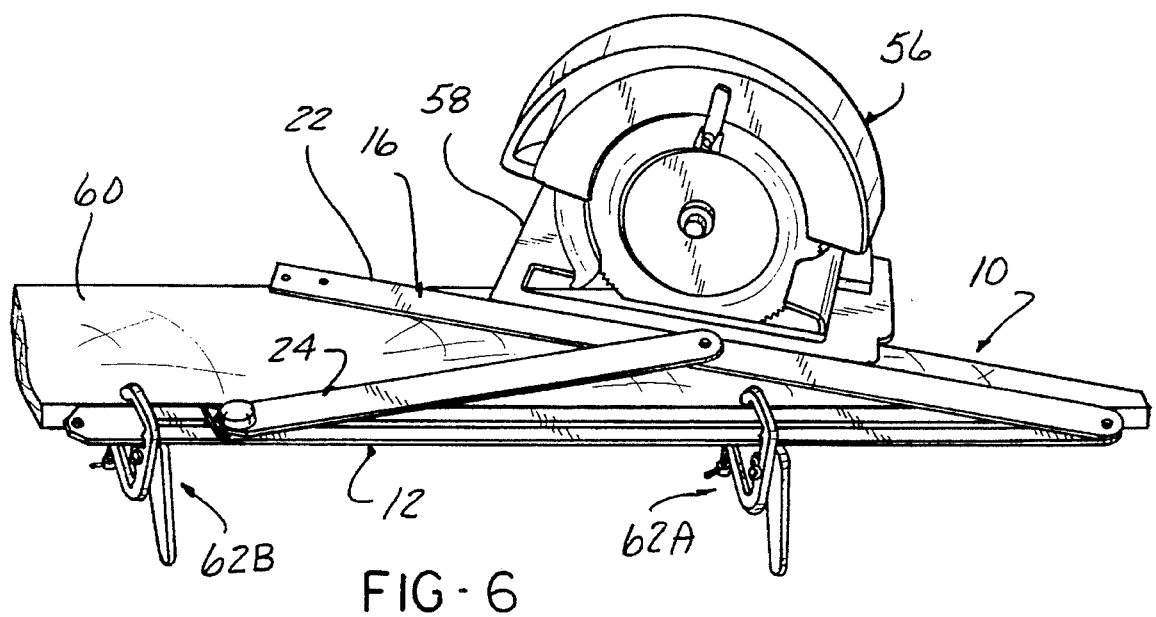
FIG. 6 is a perspective view of the device shown in FIG. 1, held in position against a workpiece with a circular saw being guided by use of the device in cutting an angled cut on the workpiece.

FIG. 6 illustrates the use of the device 10 as a sawguide in which a circular saw 56 has a housing edge 58 held against the guide edge 22 of the guide member 16. A piece of dimensional lumber 60 is shown having a shallow angle cut being made with the circular saw 56. The base member 12 is held against one side edge thereof such that the angle defined between the base member 12 and the angle member 16 is being sawn off.

According to one aspect of the present invention, means are provided for holding the angle guide member 10 with the base member 12 against the one side of the lumber piece 60. This is accomplished by a pair of dual action clamps 62A, 62B located at spaced points along the length of the base member 12.

Figure 7:
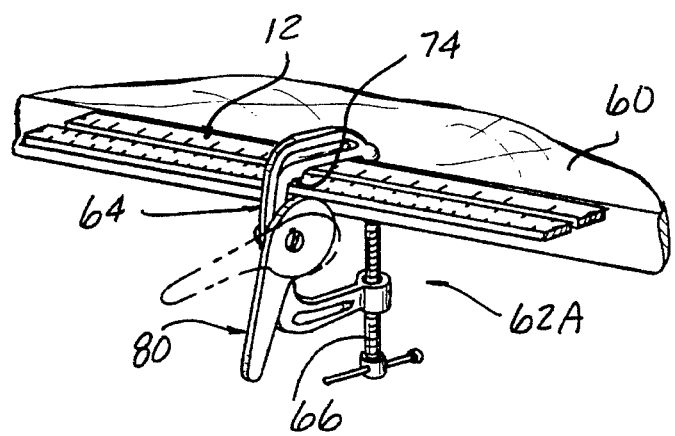
FIG. 7 is an enlarged perspective view of one of the dual action clamps used in securing the device according to the present invention in position against the workpiece as shown in FIG. 6.
Figure 9:
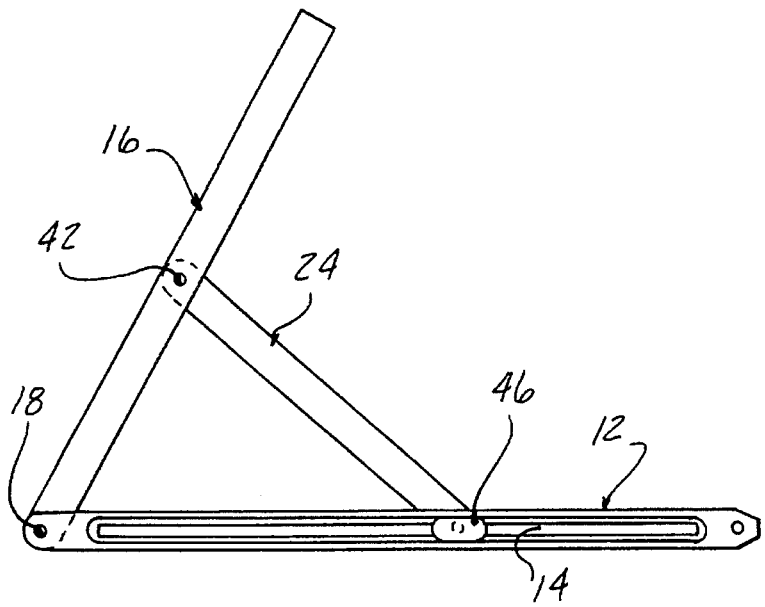
FIG. 9 is a reverse plan view of the angle guide device shown in FIG. 1.

The functions of the dual action clamps can be better seen by reference to FIGS. 7 and 8. A clamping frame 64 is provided of typical C-shaped construction, mounting a threaded rod 66 at the forward end of the frame 64 which is suitably dimensioned to extend past the base member 12 and engage the lumber piece 60 at its upper and lower faces with a clamping jaw 68 movable with the threaded rod 66 against a fixed clamping jaw 70 defined on the clamping frame member 64.

Rotation of the threaded rod 66 by means of the cross pin 72 enables the clamping of the first clamping jaw set 68, 70 to the lumber piece 60.

A recess 74 is machined into the interior face of the frame 64 such as to receive the outer edge of the base member 12. The clamping jaws 68 and 70 are secured with the base member 12 snugly fit against the side edge 76 of the lumber piece 60 but allowing fore and aft sliding movement to adjust the location of the angle guide device 10 along the length of the workpiece 60 to a location whereat the cut or line scribing is desired to be done.

A second set 78 of clamping jaws is provided which allows selective clamping of the base member 12 to the clamping frame 64 in any adjusted position. The second set of clamping jaws includes a cam lever 80 which is pivotally mounted at 82 to the clamping frame 64 and has an eccentric clamping surface 84 formed thereon which causes a clamping action of the base 12 against another clamping jaw defined by the upper surface of the recess 74, when the lever is pivoted downwardly as indicated in FIG. 8.

Accordingly, the clamps 62A and 62B can be installed with the base member 12 fit into the recesses 74 thereof with the clamps and threaded rods 66 rotated to clamp the same to the lumber piece 60. The device 10 can then be shifted lengthwise to the accurately measured location whereat the cut is to be made. The toggle levers or cam levers 80 are then flipped downwardly to lock the device 10 in position as indicated in FIGS. 7 and 8.

Figure 11:
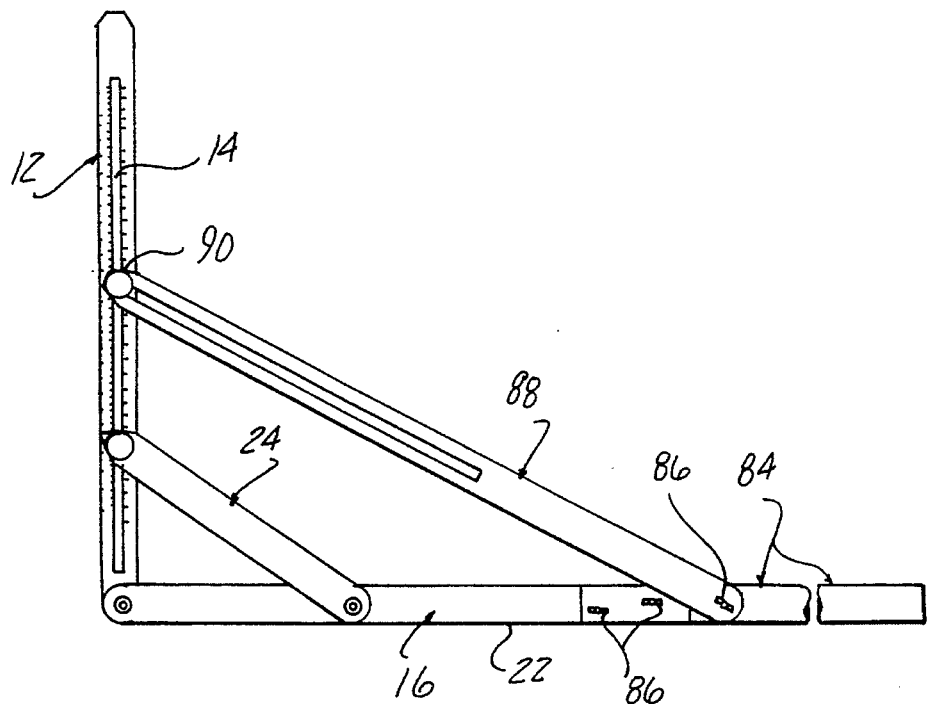
FIG. 11 is a plan view of the angle guide device with extension elements installed thereon.

It is sometimes deemed necessary that the angled guide member 16 span a considerable distance. In such cases, according to one aspect of the present invention illustrated in FIGS. 11 and 12, an extension member 84 is attached to the angle guide member 16 as with wing nuts 86 and screws (or locking pins) such as to extend the guide edge 82 a greater distance.

An auxiliary adjustment member 88 is also provided and spans a greater distance than the original adjustment member 24 such as to insure adequate support for the outer regions of the extension member 84 insuring an accurate angular relationship between the angle guide member 22, extension 84, and the base member 12.

The auxiliary adjustment member 88 is provided with a slider pin element 90 received in the slot 14 of the base member 12 to accommodate the adjusting movement, which element does not include an indicator edge.

Accordingly, it can be appreciated that the angle guide device 10 according to the present invention is very versatile in use and able to accommodate a great number of situations requiring measuring of angles, the guiding of tools, the scribing of angle line markings.

The device is also very useful for determining angles between members since the apex formed by the base member 12 and the angle guide member 16 remains clear from any interfering features through the range of pivotal adjustment allowing the members to be inserted between two angularly extending structures with these members adjusted to conform to that angle. The friction knob 30 is thereafter tightened to match their angular relationship to that of the structural members extending at an angle.

The use of the clamping devices allows much more accurate work than is easily able to be achieved by manually attempting to hold the angle guide device against the side edge of the workpiece.

The device itself positions the base member 12 just beneath the surface of the workpiece with the guide member 16 overlying the surface of the workpiece and with the adjustment member 24 spaced from the workpiece.

I claim:

1. An adjustable angle guide device comprising:

an elongated blade-shaped base member having a slot extending along the length thereof, said base member having a top face and an opposite bottom face;

an elongated blade angle guide member having a bottom face on one side lying against said top face at one end of said base member, said one end of said base member pivotally attached to said one end of said angle guide member with a pivotal attachment, said angle guide member having a guide edge extending along one side thereof remote from said base member;

each of said one ends of said base member and angle guide member radiused so that a line extending from an outside edge of said angle guide member does not intersect any projecting feature on said ends throughout an entire range of pivoting motion of said base and angle guide members about said pivotal attachment;

an elongated, blade-shaped adjustment member pivotally attached at one end to said angle guide member with a pivotal attachment located at an intermediate point along the length of said angle guide member;

said adjustment member having a bottom surface lying against said top face of said base member and against a top face of said angle guide member opposite said bottom face;

a slider element pivoted to the other end of said adjustment member and slidably engaged in said slot formed in said base member;

a series of numeric indicia markings on said one face of said base member arranged along said slot, each respective marking corresponding to the angle between said base and angle guide members when said slider element is adjacent said respective marking; and locking means selectively allowing locking of said slider element in said slot in said base member at any adjusted position therein, whereby said angle guide may be locked at each angular position relative said base member corresponding to each numeric indicia marking.

2. The angle guide device according to claim 1 wherein said adjustment member and said base member slot are sufficiently longer than said guide member so that said other end moves beyond an opposite end of said angle guide member opposite from said one end pivotally attached to said base member as to carry said slider beyond said opposite end, said angle guide member pivots to an aligned position with said base member, whereby said angle guide member may move beneath said adjustment member.

3. The angle guide device according to claim 1 wherein said slider element comprises an elongated bar portion fit into said base member slot, and a projecting top portion overlying said one face of said base member and having a portion fit into said base member slot, and a projecting top portion having a transverse edge successively aligned with said numeric indicia.

4. The angle guide device according to claim 1 further including an extension for said angle guide member detachably attached to said other end thereof and configured to provide a guide edge aligned with said angle guide member guide edge, and further including an auxiliary angle adjustment member pivoted at one end to said extension member and having an auxiliary slide element pivotally attached and received in said base member slot, and a locking means for locking said auxiliary slide element at adjusted positions in said base means slot.

5. The angle guide device according to claim 1 further including a dual action clamp having a clamping frame extending over said base member, a first set of clamping jaws for clamping to a workpiece edge, and a second set of clamping jaws located to clamp said base member, whereby said base member can be clamped in position held against said workpiece edge by operation of said first and second clamping jaws.

6. An adjustable angle guide device comprising:

an elongated bar shaped base member having a slot extending along the length thereof, said base member having a top surface;

an elongated blade angle guide member having a bottom face, with one end of said bottom face lying against said top surface of said base member at one end of said base member, and pivotally attached thereto with a pivotal attachment, said angle guide member having a guide edge extending along one side thereof;

a dual action clamp having a clamping frame extending over said base member, a first set of clamping jaws for clamping to a workpiece edge, and a second set of clamping jaws located to clamp said base member, whereby said base member can be held against said workpiece edge by operation of said first and second clamping jaws;

an elongated, blade-shaped adjustment member pivotally attached at one end to said guide member at an intermediate point along the length thereof with a bottom surface against said top surface of said base member;

a slider element pivoted to the other end of said adjustment member and slidably engaged in said slot formed in said base member;

a series of numeric indicia markings on said top surface of said base member along said slot, each respective marking corresponding to the angle between said base and angle guide members when said slider element is adjacent said respective marking;

whereby said angle guide may be locked at each angular position relative said base member corresponding to each numeric indicia marking.

7. The device according to claim 6 wherein said first set of clamping jaws includes a threaded rod carrying a clamping disc towards a fixed clamping surface on said frame, and said second set of clamping jaws includes a cam lever pivotally mounted to said clamp frame opposite a second fixed clamping surface offset from said first recited clamping surface, said cam lever having an eccentric perimeter causing a clamping of said base member against said second clamping surface.

8. The device according to claim 7 wherein a second clamp is provided spaced along the length of said base member from said first mentioned clamp.

* * * * *